US008276958B2

(12) United States Patent
Ihrke et al.

(10) Patent No.: US 8,276,958 B2
(45) Date of Patent: Oct. 2, 2012

(54) BIDIRECTIONAL TENDON TERMINATOR

(75) Inventors: Chris A. Ihrke, Hartland, MI (US); Douglas Martin Linn, White Lake, MI (US); Lyndon Bridgwater, Houston, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 994 days.

(21) Appl. No.: 12/269,579

(22) Filed: Nov. 12, 2008

(65) Prior Publication Data

US 2010/0116079 A1 May 13, 2010

(51) Int. Cl.
*B25J 15/00* (2006.01)
*B66C 1/00* (2006.01)

(52) U.S. Cl. .................... 294/111; 74/490.05; 74/490.06

(58) Field of Classification Search ................... 294/106, 294/111; 403/123; 446/376, 381, 383; 901/21, 901/30, 31, 28, 29; 74/490.05, 490.06; 606/153
See application file for complete search history.

(56) References Cited

U.S. PATENT DOCUMENTS

| 1,500,921 | A | * | 7/1924 | Mogens et al. | ............. | 285/146.2 |
| 2,029,532 | A | * | 2/1936 | Karcher | ........................ | 403/114 |
| 2,422,302 | A | * | 6/1947 | Horn | ................................ | 623/61 |
| 2,460,880 | A | * | 2/1949 | Harvey et al. | .................... | 403/54 |
| 4,227,826 | A | | 10/1980 | Conrad | | |
| 4,246,661 | A | * | 1/1981 | Pinson | ............................ | 623/25 |
| 5,172,370 | A | | 12/1992 | Suzuki | | |
| 6,244,644 | B1 | * | 6/2001 | Lovchik et al. | ............... | 294/111 |
| 2008/0108443 | A1 | | 5/2008 | Jinno | | |

FOREIGN PATENT DOCUMENTS

| DE | 874 685 | 4/1953 |
| DE | 297 15 979 U1 | 11/1997 |
| DE | 197 55 465 A1 | 6/1999 |
| DE | 10 2006 006 322 B3 | 6/2007 |
| EP | 0 156 419 (A2) | 2/1985 |
| JP | 53-111149 | 9/1978 |
| JP | 64-26791 | 1/1989 |
| JP | 2004-082243 (A) | 3/2004 |
| JP | 2006-192523 (A) | 7/2006 |

* cited by examiner

*Primary Examiner* — Dean Kramer
*Assistant Examiner* — Stephen Vu
(74) *Attorney, Agent, or Firm* — John A. Miller; Miller IP Group, PLC

(57) ABSTRACT

A bidirectional tendon terminator that has particular application for terminating a tendon that actuates a finger in a robotic arm. The tendon terminator includes a cylindrical member having an internal channel through which a single continuous piece of the tendon extends. The internal channel of the tendon terminator includes a widened portion. A ball is placed in the tendon strands, which causes the tendon to expand, and the ball is positioned within the widened portion of the channel. Pulling on the tendon operates to either open or close the finger of the robotic arm depending on which direction the tendon is pulled. In one specific embodiment, the cylinder includes two cylindrical pieces that are coupled together so that the ball can be positioned within the channel and the cylindrical member has an entire circumference of material.

18 Claims, 2 Drawing Sheets

BIDIRECTIONAL TENDON TERMINATOR

STATEMENT REGARDING FEDERALLY SPONSORED RESEARCH OR DEVELOPMENT

The invention described herein may be manufactured and used by or for the U.S. Government for U.S. Government (i.e., non-commercial) purposes without the payment of royalties thereon or therefore.

BACKGROUND OF THE INVENTION

1. Field of the Invention

This invention relates generally to a bidirectional tendon terminator and, more particularly, to a bidirectional tendon terminator for a robotic hand that is compact enough to fit in a very small space and strong enough for various applications.

2. Discussion of the Related Art

Dexterous robot systems are known in the art that perform a variety of functions. A dexterous robot system typically includes a robotic arm having a robotic hand with fingers and related joints that operate to grasp an object or part for a particular application. In one dexterous robot system design, tendons are employed to actuate the fingers where the tendons are coupled to the finger joints. The actuators that actuate the tendons to move the fingers are typically positioned within the forearm area of the robotic arm. Tendons extend from the actuators to the finger joints, where they are attached. Typically, it takes two tendons to actuate a single joint of the finger, one tendon to close the finger and another tendon to open the finger.

The tendons that are used to actuate a finger in a dexterous robotic system of this type need to be attached to the finger by a suitable attachment device that is strong enough for a particular application and small enough to easily fit in the finger.

SUMMARY OF THE INVENTION

In accordance with the teachings of the present invention, a bidirectional tendon terminator is disclosed that has particular application for terminating a tendon that actuates a finger in a robotic arm. The tendon terminator includes a cylindrical member having an internal channel through which a single continuous piece of the tendon extends. The internal channel of the tendon terminator includes a widened portion. A ball is placed in the tendon strands, which causes the tendon to expand, and the ball is positioned within the widened portion of the channel. Thus, pulling on the tendon in one direction or the other direction causes a pulling force on the tendon terminator as a result of the ball being wedged within the channel. This action operates to either open or close the finger of the robotic arm depending on which direction the tendon is pulled. In one specific embodiment, the cylinder includes two cylindrical pieces that are coupled together so that the ball can be positioned within the channel and the cylindrical member has an entire circumference of material.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a bidirectional tendon terminator is merely exemplary in nature, and is in no way intended to limit the invention or its applications or uses. Particularly, the tendon terminator of the present invention has particular application for actuating a finger of a robotic arm. However, as will be appreciated by those skilled in the art, the tendon terminator of the invention may have other applications.

Figure 1:
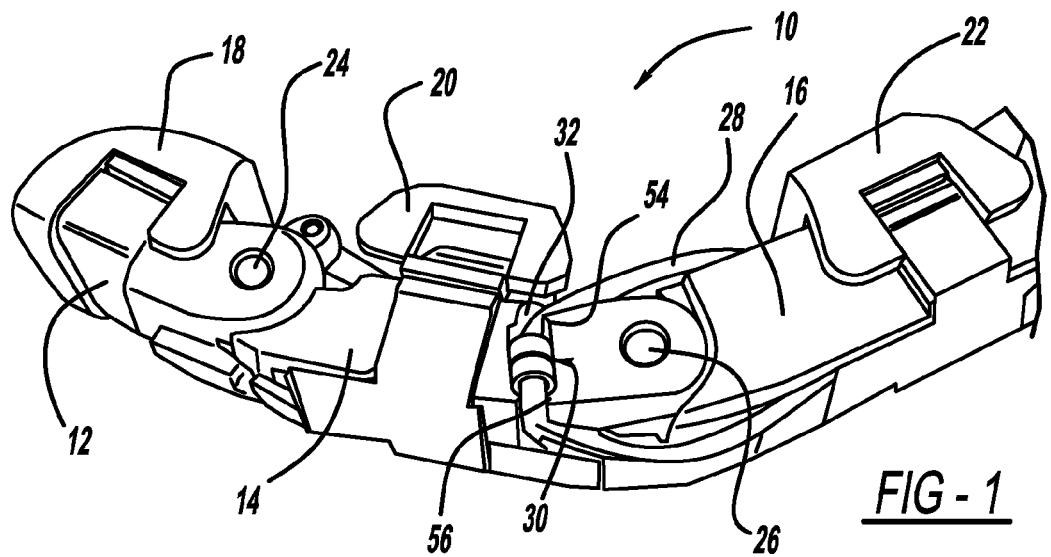
FIG. 1 is a perspective view of a finger for a dexterous robotic arm including a bidirectional tendon terminator.

FIG. 1 is a perspective view of a robotic finger 10 for a robotic arm. The robotic finger 10 includes three finger sections, namely, a tip section 12, an intermediate section 14 and a base section 16. The tip section 12 includes a pad 18, the intermediate section 14 includes a pad 20 and the base section 16 includes a pad 22 that allow the finger 10 to effectively grasp a particular part (not shown). The sections 12, 14 and 16 and the pads 18, 20 and 22 can be made of any suitable material, such as aluminum, for a particular application. The tip section 12 pivots relative to the intermediate section 14 on a shaft 24 and the intermediate section 14 pivots relative to the base section 16 on a shaft 26.

The intermediate section 14 is pivoted relative to the base section 16 by actuating a tendon 28. In one non-limiting embodiment, the tendon 28 is a braided polymer tendon having a diameter of about 0.048 inches and is capable of withstanding the forces used for the various dexterous robot applications, such as providing about 100 lbs of force. The tendon 28 is attached to the intermediate section 14 and is terminated by a bidirectional tendon terminator 30 that is positioned within a slot 32 in the intermediate section 14. The tendon 28 extends through the tendon terminator 30 as a continuous single piece. By pulling on the tendon 28 on one side of the tendon terminator 30, the intermediate section 14 will pivot on the shaft 26 to close the finger 10 and by pulling on the other side of the tendon 28, the tendon terminator 30 causes the finger 10 to be opened.

Figure 2:
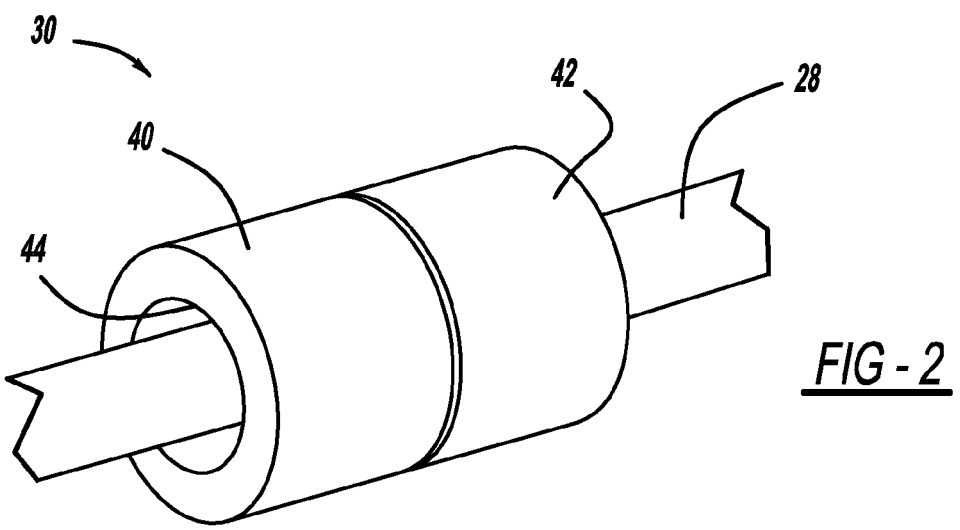
FIG. 2 is a perspective view of the tendon terminator shown in FIG. 1 removed from the robotic finger.
Figure 3:
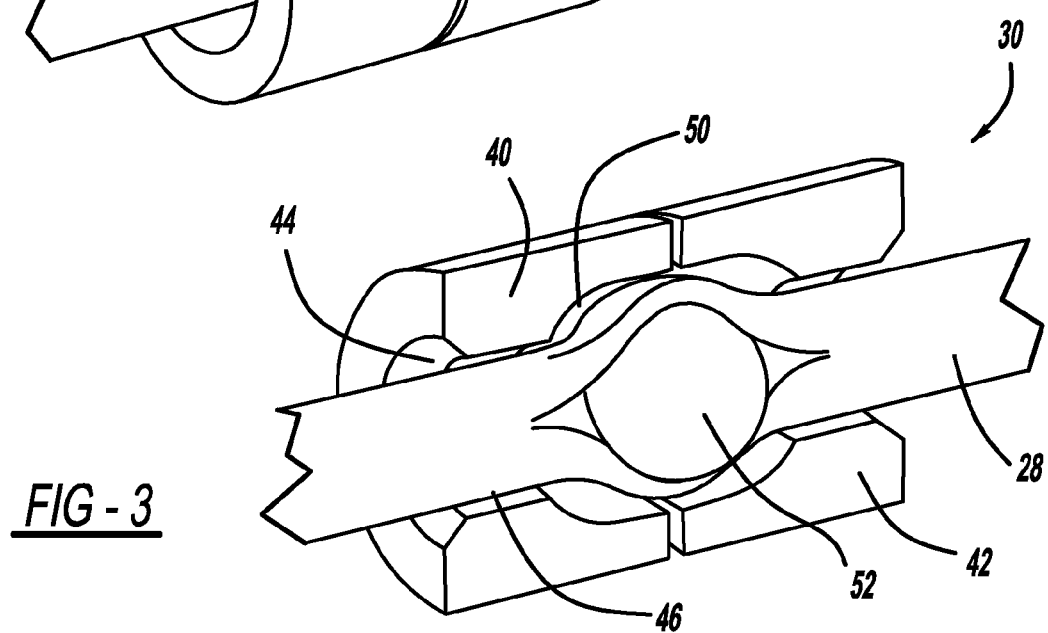
FIG. 3 is a cross-sectional view of the tendon terminator shown in FIG. 2.

FIG. 2 is a perspective and FIG. 3 is a cross-sectional view of the tendon terminator 30 separated from the robotic finger 10. In this non-limiting embodiment, the tendon terminator 30 includes two separate cylindrical members 40 and 42 including a common cooperative channel 44 extending therethrough, where the tendon 28 extends through the channel 44. The channel 44 includes a narrow portion 46 at outside ends of the cylindrical members 40 and 42 and a wide portion 50 towards a middle of the channel 44 at an inside end of the cylindrical pieces. A ball 52 is positioned within braided strands of the tendon 28 and has a diameter so that it fits within the wide portion 50, but is too wide to go through the narrowed portion 46 of the channel 44. Thus, by pulling on one end of the tendon 28, the tendon terminator 30 is pulled in one direction and by pulling on the other end of the tendon 28, the tendon terminator 30 is pulled in an opposite direction. Because the tendon terminator 30 is locked within the slot 32 by ridges 54 and 56, pulling on the tendon 28 causes the intermediate section 14 of the finger 10 to open or close, as discussed above.

The cylindrical members 40 and 42 can be attached together in any suitable manner, such an epoxy. Epoxy may be applied to the braided strands of the tendon 28 within the wide portion 50 of the terminator 30 around the ball 50, which will serve to hold the assembly together. In one non-limiting embodiment, the combined cylindrical members 40 and 42 have a length of about 0.2 inches and a diameter of about 0.125 inches.

In one embodiment, the cylindrical members 40 and 42 are machined out of aluminum to provide ease of manufacturing. Because the cylindrical members 40 and 42 are made of a softer material in this embodiment, it may be necessary to provide the full circumference of the material of the cylindrical members 40 and 42 to provide the desired strength. For example, the tendon 28 may be required to hold 100 lbs of force to achieve the desired grasping force for the finger. For other embodiments, other designs of the tendon terminator can be employed.

Figure 4:
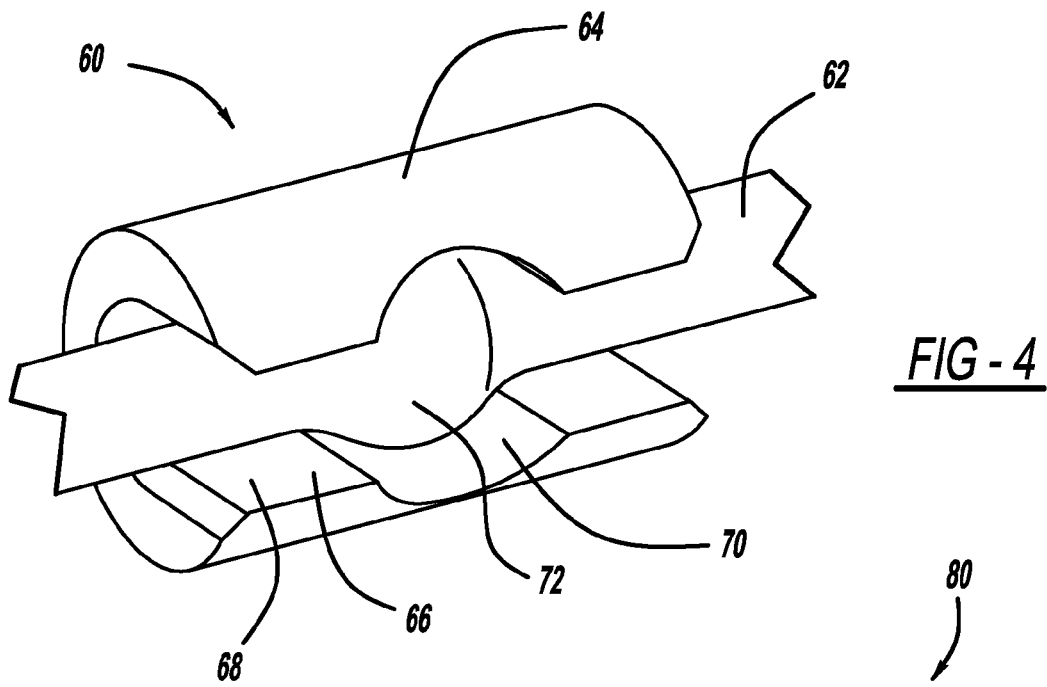
FIG. 4 is a perspective view of a tendon terminator according to another embodiment.

FIG. 4 is a perspective view of a tendon terminator 60 for terminating a continuous tendon 62 extending therethrough. The tendon terminator 60 includes a cylindrical member 64, a slot 66 having a narrow portion 68 and a center wide portion 70. As above, a ball 72 is positioned within the tendon 62 and placed in the center portion 68. Thus, actuation of the tendon 62 pulls on the tendon terminator 60 in the manner as discussed above to actuate the finger 10. Because the slot 66 is formed in the cylindrical member 64, it is not necessary to provide two separate pieces of the cylindrical member as for the tendon terminator 30. However, also because the slot 66 is formed in the cylindrical member 64, a portion of the circumference of the cylindrical member 64 is removed, reducing the strength of the tendon terminator 60 over the tendon terminator 30. Thus, if the cylindrical member 64 is made of machined aluminum, it may not stand up to the desired forces. However, other materials, such as steel, may provide adequate strength.

Figure 5:
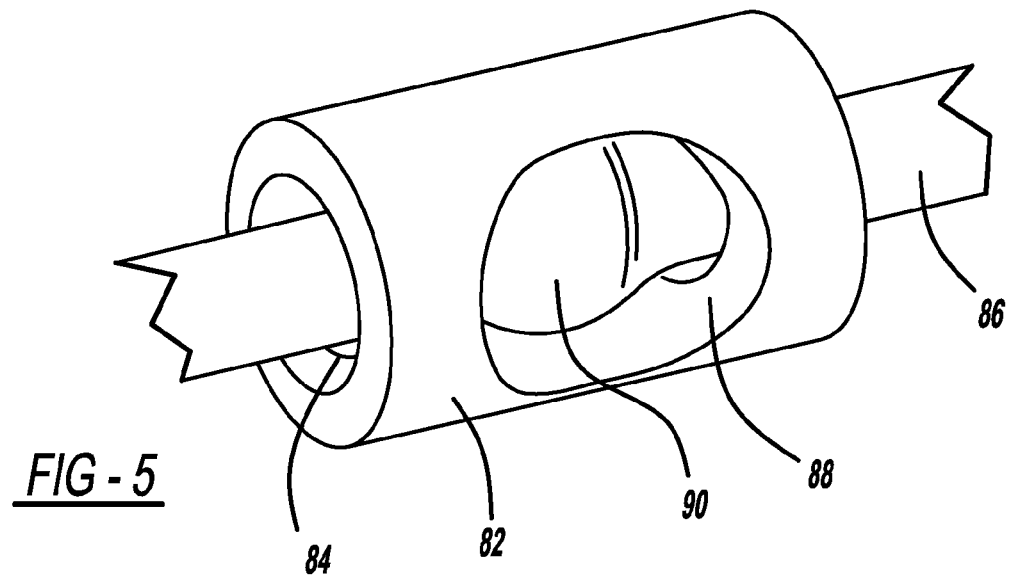
FIG. 5 is a perspective view of a tendon terminator according to another embodiment.

FIG. 5 is a perspective view of a tendon terminator 80. The tendon terminator 80 includes a single piece cylindrical member 82 having a channel 84 extending therethrough and accommodating a tendon 86, as discussed above. An opening 88 is formed in the cylindrical member 82 and is in communication with the channel 84. A ball 90 is provided within the tendon 86 so that it is positioned within the opening 88 where tension on either end of the tendon 86 provides a force on the tendon terminator 80 in the manner as discussed above. This embodiment provides additional strength over the tendon terminator 60 because the cylindrical member 82 includes continuous sections around its circumference at both ends. However, in order to get the ball 90 within the tendon 86, the tendon 86 is first threaded through the channel 84 than pulled out of the opening 88. The ball 90 is then placed within the tendon 86. In this process, the tendon 86 may be damaged.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A tendon terminator comprising:
   a cylindrical member including a channel extending therethrough, said channel including narrow end portions and a widened center portion;
   a tendon extending through the channel in the cylindrical member; and
   a ball positioned within the tendon and placed within the center portion of the channel, said ball having a diameter so that it fits within the center portion of the channel, but does not fit within the narrow end portions of the channel so that the ball is locked within the cylindrical member and tension on the tendon from either side of the cylindrical member causes the cylindrical member to move in the direction of the tension.

2. The tendon terminator according to claim 1 wherein the cylindrical member includes a first cylindrical piece and a second cylindrical piece secured together where the first cylindrical piece and the second cylindrical piece each include a narrow end portion of the channel and provide a portion of the center portion and where the first and second cylindrical pieces can be spaced apart to allow the ball to be positioned within the tendon and then can be secured together to hold the ball within the center portion of the channel.

3. The tendon terminator according to claim 1 wherein the cylindrical member includes a slot formed in a sidewall of the cylindrical member that is in communication with the channel.

4. The tendon terminator according to claim 1 wherein the cylindrical member includes an opening formed in a side wall of the cylindrical member that is in communication with the center portion of the channel.

5. The tendon terminator according to claim 1 wherein the cylindrical member is machined aluminum.

6. The tendon terminator according to claim 1 wherein the tendon terminator terminates a tendon that actuates a finger of a robotic arm.

7. The tendon terminator according to claim 1 wherein the cylindrical member is about 0.2 inches long and about 0.125 inches in diameter.

8. The tendon terminator according to claim 1 wherein the ball is placed within braided strands of the tendon.

9. A tendon terminator comprising:
   a cylindrical member including a first cylindrical piece and a second cylindrical piece that are secured together, said cylindrical member including a channel extending therethrough, said channel including a first narrow end portion in one of the cylindrical pieces, a second narrow end portion in the other of the cylindrical pieces and a widened center portion provided in both of the first and second cylindrical pieces;
   a tendon extending through the channel in the cylindrical member; and
   a ball positioned within braided strands of the tendon and placed within the center portion of the channel, said ball having a diameter so that it fits within the center portion of the channel, but does not fit within the first and second narrow portions of the channel so that the ball is locked within the cylindrical member and tension on the tendon from either side of the cylindrical member causes the cylindrical member to move in the directed of the tension.

10. The tendon terminator according to claim 9 wherein the cylindrical member is machined aluminum.

11. The tendon terminator according to claim 9 wherein the tendon terminator terminates a tendon that actuates a finger of a robotic arm.

12. The tendon terminator according to claim 9 wherein the cylindrical member is about 0.2 inches long and about 0.125 inches in diameter.

13. A bidirectional tendon terminator for terminating a tendon that actuates a finger of a robotic arm, said tendon terminator comprising:
   a cylindrical member including a channel extending therethrough, said channel including narrow end portions and a widened center portion, said cylindrical member being machined aluminum;

a tendon extending through the channel in the cylindrical member; and a ball positioned within the tendon and placed within the center portion of the channel, said ball having a diameter so that it fits within the center portion of the channel, but does not fit within the narrow end portions of the channel so that the ball is locked within the cylindrical member and tension on the tendon from either side of the cylindrical member causes the cylindrical member to move in the direction of the tension.

14. The tendon terminator according to claim 13 wherein the cylindrical member includes a first cylindrical piece and a second cylindrical piece secured together where the first cylindrical piece and the second cylindrical piece each include a narrow end portion of the channel and provide a portion of the center portion and where the first and second cylindrical pieces can be spaced apart to allow the ball to be positioned within the tendon and then can be secured together to hold the ball within the center portion of the channel.

15. The tendon terminator according to claim 13 wherein the cylindrical member includes a slot formed in a sidewall of the cylindrical member that is in communication with the channel.

16. The tendon terminator according to claim 13 wherein the cylindrical member includes an opening formed in a side wall of the cylindrical member that is in communication with the center portion of the channel.

17. The tendon terminator according to claim 13 wherein the cylindrical member is about 0.2 inches long and about 0.125 inches in diameter.

18. The tendon terminator according to claim 13 wherein the ball is placed within braided strands of the tendon.

* * * * *